United States Patent
Ng et al.

[11] Patent Number: 6,097,845
[45] Date of Patent: Aug. 1, 2000

[54] IMAGE DISCRIMINATOR

[75] Inventors: Samson Y. Ng, Newark; Bruce E. Hochuli, Gilroy, both of Calif.

[73] Assignee: Canon Kabushiki Kaisha, Tokyo, Japan

[21] Appl. No.: 08/955,217

[22] Filed: Oct. 21, 1997

[51] Int. Cl.$^7$ .............................. G06K 9/36; H04N 1/417; H04N 1/46
[52] U.S. Cl. ........................... 382/239; 358/430; 358/500
[58] Field of Search .................... 382/239, 232, 382/234, 168, 170, 171, 172, 250; 348/404–407, 419; 358/261.2, 430, 500

[56] References Cited

U.S. PATENT DOCUMENTS

| | | | |
|---|---|---|---|
| 4,394,774 | 7/1983 | Widergren et al. | 382/239 |
| 4,447,829 | 5/1984 | Schayes et al. | 358/430 |
| 5,361,144 | 11/1994 | Sugiura | 358/500 |

OTHER PUBLICATIONS

Zoran Corporation, "ZR36050, JPEG Image Compression Processor," Santa Clara, CA, Jul. 1996, whole document. (listed in the IDS of the copending case 08/967,337).
"PM–2m User's Guide", Pixel Magic, document #UG–10–10, revision 1.0, Oct. 1996, pp. 11,—19–22.
Pennebaker, W. B. and Mitchell, J. L., "JPEG Still Image Data Compression Standard", Reinhold, pp. 97–134, 1993.
Gonzalez, R. C. and Woods, R. E., "Digital Image Processing", Addison–Wesley: pp. 389–94. 1992.

Primary Examiner—Thomas D. Lee
Assistant Examiner—Wenpeng Chen
Attorney, Agent, or Firm—Fenwick & West LLP

[57] ABSTRACT

A system and method for discriminating among image characteristics in order to select among a plurality of compression techniques. Multiple compression schemes are applied to a source image (101) concurrently and the results are stored. Image discrimination is performed in parallel with the image compression to generate a recommendation regarding the stored compressed images.

27 Claims, 3 Drawing Sheets

IMAGE DISCRIMINATOR

CROSS-REFERENCE TO RELATED APPLICATION

This application is related to U.S. patent application Ser. No. 08/987,337 for "Hybrid Image Compressor," filed on the same day as the present application. The disclosure of the related application is incorporated herein by reference.

BACKGROUND OF THE INVENTION

1. Field of the Invention

The present invention relates generally to image compression systems, and more particularly to a system and method of discriminating among image characteristics in order to select among a plurality of compression techniques.

2. Description of Background Art

Modern image scanning equipment typically includes hardware and/or software technology for the compression of scanned images or documents. In recent years, with the proliferation of digitized images being transmitted along communications channels, particularly on the Internet, there has been a growing need for effective and efficient compression techniques. Many compression standards have emerged, with the relative effectiveness of each standard being dependent on the types of images being processed. Specifically, the most commonly-used compression standards and techniques are optimized for particular types of images; such methods tend to be less effective when applied to other image types. In addition, some techniques are "lossy", meaning that some image data is lost when the image is reconstructed, while others are "lossless", meaning that no image data is lost. For some images, lossy compression is acceptable, whereas for others it is not.

One relatively ubiquitous compression standard is the Joint Photographic Experts Group (JPEG) standard, described in W. B. Pennebaker & J. L. Mitchell, *JPEG Still Image Data Compression Standard*, Reinhold: 1993, pp. 389–94. JPEG is typically a lossy compression standard, though loss-less versions are available. JPEG operates by dividing each color component of the image into blocks of predefined dimension (such as eight pixels by eight pixels), performing discrete cosine transform (DCT) operations on square subregions in the image, truncating the precision of the terms which result, and finally performing a run-length compression. The JPEG standard is highly effective for grayscale and color images having multiple hues or shading. It is less effective, however, for bitonal images.

Other techniques yield good results when compressing bitonal images but may be less effective for grayscale. These include, for example, the 1-D Consultative Committee of the International Telephone and Telegraph (CCITT) Group 3 and Group 4 standards (G3 and G4), described in R. C. Gonzalez & R. E. Woods, *Digital Image Processing*, Addison-Wesley: 1992. G3 performs nonadaptive one-dimensional run-length coding with optional two-dimensional coding of the last K-1 lines of each group of K lines (for K=2 or 4). G4 is a simplified version of G3 in which only two-dimensional coding is performed.

Other standards are also known and available for bitonal image compression, such as for example the Joint Bilevel Imaging Group (JBIG) standard, ISO IS 11544, equivalent to ITU-T T.82, described in *PM-2m User's Guide*, Pixel Magic, October 1996, document #UG-10-10, revision 1.0. JBIG uses an adaptive algorithm, in contrast to the nonadaptive technique of G3 and G4.

One problem with existing compression schemes is that they tend to be optimized for a particular type of image, and are therefore less effective when processing some other type. For example, JPEG, while highly effective for grayscale images, is less effective for bitonal images and may result in a compressed image with little useful information. Conversely G3, G4, and JBIG, while useful for bitonal images, are less effective when applied to grayscale images and may result in a failure to compress effectively. In fact, in some cases a misapplied compression technique may fail to compress the image at all, and may even cause the image to take up more space than it did in its original form.

Accordingly, what is needed is a system and method for classifying an image according to some predetermined criterion or criteria, such as grayscale versus bitonal, in order to select a compression technique that is well-adapted to the image being processed.

Many image scanning apparatuses pass a physical representation of the image, such as a sheet of paper, over an optical scanning mechanism. Pre-scanning of an image in order to perform classification may result in slower processing time due to the fact that the image must be scanned twice (once for classification, and a second time for compression). In high-volume operations, where this may result in doubling of processing time, such a reduction in efficiency may be unacceptable.

Thus, what is further needed is a system and method that is capable of performing the above-mentioned classification without introducing additional scanning time in the processing of images.

SUMMARY OF THE INVENTION

In accordance with the present invention, there is provided a system (100) and method of examining the tonal content of an image in order to analyze image characteristics and thereby recommend or select an appropriate compression technique. In one embodiment, the present invention operates to discriminate between images having primarily grayscale components and those having primarily bitonal components. A suitable grayscale/bitonal discrimination technique such as histogram analysis (309) is employed to measure and evaluate the respective image components.

Responsive to the analysis of image components, the present invention is able to provide recommendations (310), perform automated selection of one compression technique, allow manual override by a user, perform both compression techniques and save all data, or perform other forms of processing.

In one embodiment, the discrimination operation takes place concurrent with the compression technique. Thus, multiple forms of compression are applied to the source image in parallel, to create for example a JPEG-compressed image, a G3-compressed image, and the like. Selection among the various forms of compressed image is then performed. In this way, the present invention is able to avoid multiple passes of the source document (101) through the scanning mechanism (102).

DETAILED DESCRIPTION OF THE PREFERRED EMBODIMENTS

Figure 1:
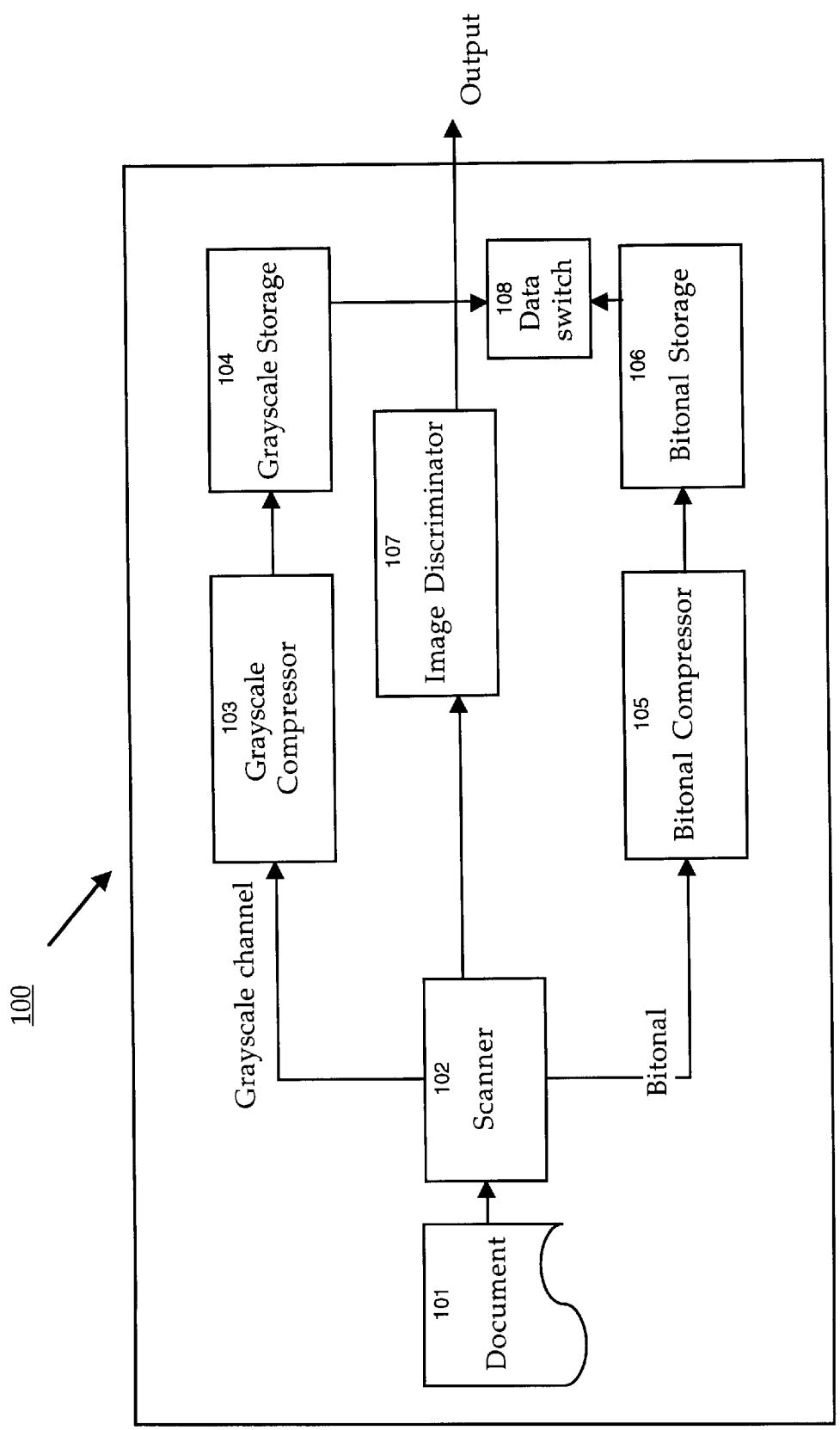
FIG. 1 is a block diagram of a system for practicing the present invention.

Referring now to FIG. 1, there is shown a block diagram of a system 100 for practicing the present invention. System 100 may be implemented as functional components within a scanning system, and may take the form of hardware or software, or some combination thereof. In one embodiment, the components shown in FIG. 1 are implemented as functional objects within a GP200 copier, available from Canon. The GP200 copier is capable of operating at speeds up to 20 pages per minute, though the present invention is not limited to such speeds. In alternative embodiments, the components of FIG. 1 may be implemented in any hardware platform suitable for scanning systems.

In the following discussion, the invention will be described in terms of grayscale compression and bitonal compression, for illustrative purposes. In alternative embodiments, however, other forms of compression may be applied to the source image, and other types of image discriminations and analysis may be performed to select among these compression techniques. For example, color compression may be used, in which case an analysis of chrominance and luminance components might be performed in order to provide recommendations among various color and non-color compression schemes.

Document 101 is typically a paper document containing a source image of some kind. The source image may be primarily grayscale, such as a photograph, or primarily bitonal, such as text. Alternatively, the source image is a more complex image type incorporating both grayscale and bitonal components. In such cases, preprocessing may be performed before application of the present invention.

Document 101 is scanned by scanner 102, which is a conventional device for converting paper-based images into electronic form using optical means.

Scanned document 101 is concurrently processed along two compression channels: a grayscale channel and a bitonal channel. By simultaneously performing these two types of compression on the source image, throughput is improved over sequential (non-concurrent) pre-scanning and compression methods. Separate processors may be employed to perform the compression methods in parallel. In alternative embodiments, more than two such compression techniques may be applied concurrently.

Grayscale compressor 103 is a conventional JPEG compressor such as the model #Z36050 hardware-implemented image compressor from Zoran. Compressed image resulting from the application of JPEG compression is stored in grayscale storage 104, which in one embodiment is conventional random access memory (RAM). Alternatively, compressed images may be stored in hard drive storage or some other storage medium. Typical storage space requirements for a JPEG-compressed 8.5"×11" image at 600 dots per inch (dpi) are approximately 3.5 megabytes.

In one embodiment, a preview image (not shown) is also generated by grayscale compressor 103. Some compressors, such as the model #Z36050, are able to produce a preview image concurrently with the JPEG-compressed image and without any performance penalty. This is generated based on the average (or DC) level of each square subregion generated during JPEG compression. The preview image may be generated in real-time (concurrently) for review by the user, and may be stored and/or displayed if desired.

Other compression techniques, such as wavelet or LZW compression, may be used instead of or in addition to JPEG compression for the grayscale channel.

Bitonal compressor 105 is a conventional G3, G4, or JBIG compressor such as the model #PM2 hardware-implemented image compressor from Pixel Magic. The #PM2 is capable of performing any of the three aforementioned bitonal compression schemes, as preselected by the user. Compressed image resulting from the application of bitonal compression is stored in bitonal storage 106, which in one embodiment is conventional random access memory (RAM). Alternatively, compressed images may be stored in hard drive storage or some other storage medium. Typical storage space requirements for a bitonal-compressed 8.5"×11" image at 600 dpi are approximately 400 kilobytes.

Concurrently with the procession of the grayscale and bitonal compression channels, image discriminator 107 measures the grayscale component of scanned document 101. Image discriminator 107 generates output based on the results of its measurement, in order to recommend which of the stored compressed representations should be used. In one embodiment, a data switch 108 is employed which performs double-buffered storage in dynamic RAM (DRAM) of the various compressed images, including for example JPEG compression, bitonal compression, preview, and recommendation from image discriminator. The output of system 100 may then be generated and transmitted to a user or application based on the double-buffered storage.

Figure 2:
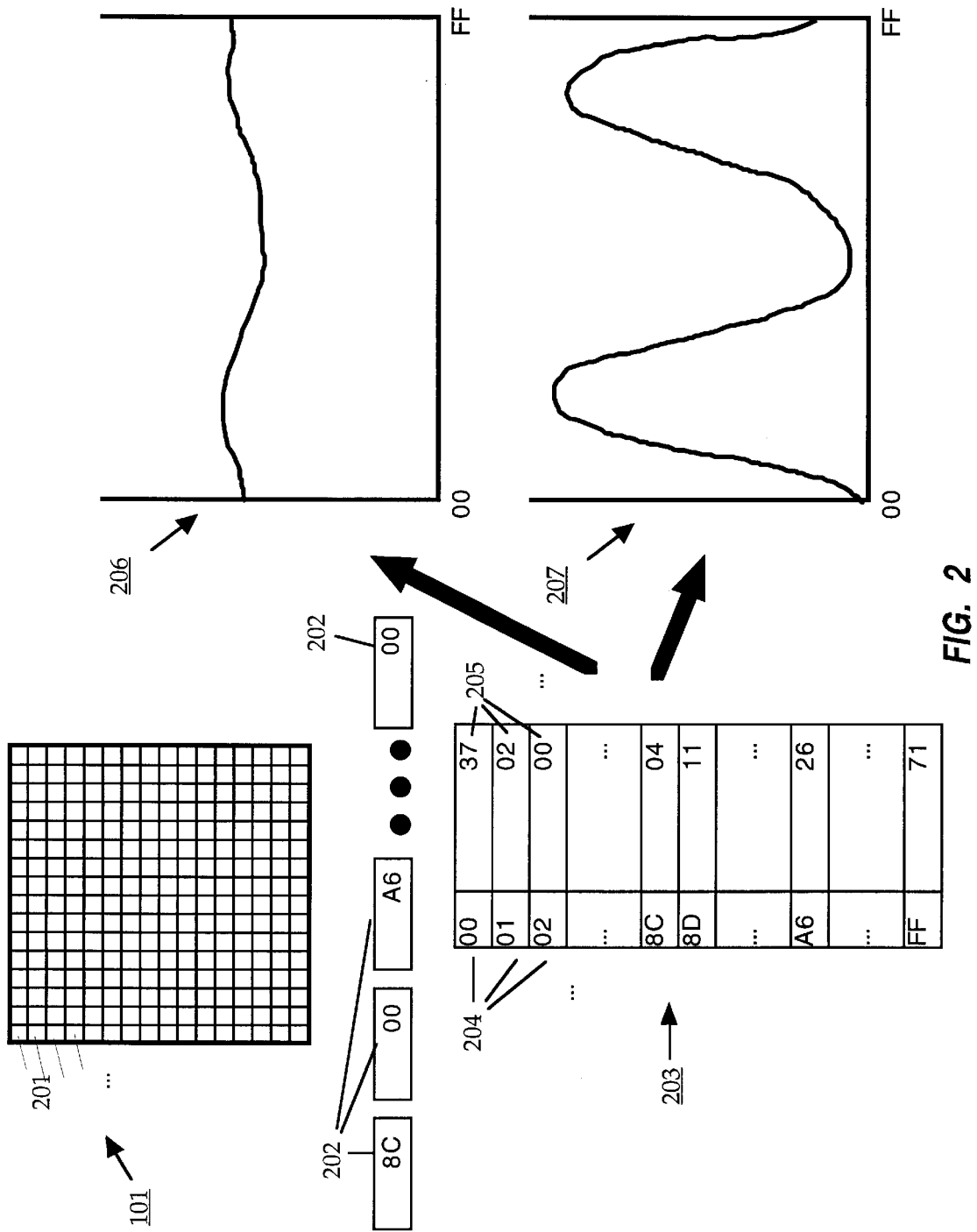
FIG. 2 is a conceptual diagram of histogram analysis according to the present invention.

In one embodiment, image discriminator 107 performs pixel-by-pixel histogram analysis. Each pixel of the source image is analyzed to determine its relative luminance value. A counter is established for each of a fixed number of luminance values. In one embodiment, 256 such counters are established. For each pixel, a selected counter is incremented depending on the luminance value of the pixel being processed. A histogram is then constructed from the counter values. Referring now to FIG. 2, there is shown a conceptual diagram of this method.

Document 101, containing a source image, comprises many individual pixels 201, each having a luminance value. In other embodiments, other relevant values such as chrominance, intensity, and the like may be used in place of or in addition to luminance. A memory location 202 in RAM is associated with each pixel 201. In the example of FIG. 2, sample values are shown in each memory location 202, representing measurements of luminance ranging from 00 to FF in hexadecimal (corresponding to 0 to 255). In other embodiments, other value ranges may be used.

A luminance table 203 is established in another area of RAM, having an entry 204 for each luminance value in the range. Thus, in the example shown, 256 entries 204 are shown. Each entry 204 has an address indexed by the corresponding luminance value, and also contains a value for a counter 205. Counter 205 represents the total number of pixels in document 101 having a luminance value corresponding to the index for that entry 204. Thus, in the example shown, there are 37 pixels with luminance value 00, 2 pixels with luminance value 01, and so on.

Image discriminator 107 traverses document 101, and for each pixel 201, increments the appropriate counter 205 in table 203 corresponding to the luminance value of the pixel 201. When traversal is complete, a histogram can be derived from the counter values 205 stored in table 203. FIG. 2 shows two examples of such a histogram. Histogram 206 shows a result that might be derived from a grayscale image, having relatively even distribution of luminance values from 00 to FF. Histogram 207 shows a result that might be derived from a bitonal image, having two distinct peaks indicating that most of the pixels 201 in document 101 have luminance values near one of two values.

The histogram can then be analyzed to determine whether the image is predominantly grayscale or bitonal. In one embodiment, only the grayscale levels in the mid-region of the histogram are evaluated. If the number of mid-level pixels exceeds a critical threshold value, the grayscale channel is recommended.

In other embodiments, other histogram patterns may emerge and be classified for other image characteristics. For example, a determination might be made as to whether the image contains a substantial color component by analyzing a histogram of color distribution. For such alternative embodiments, the basic technique described above would still be employed, though measured values for each pixel would be determined according to a criterion other than luminance.

Figure 3:
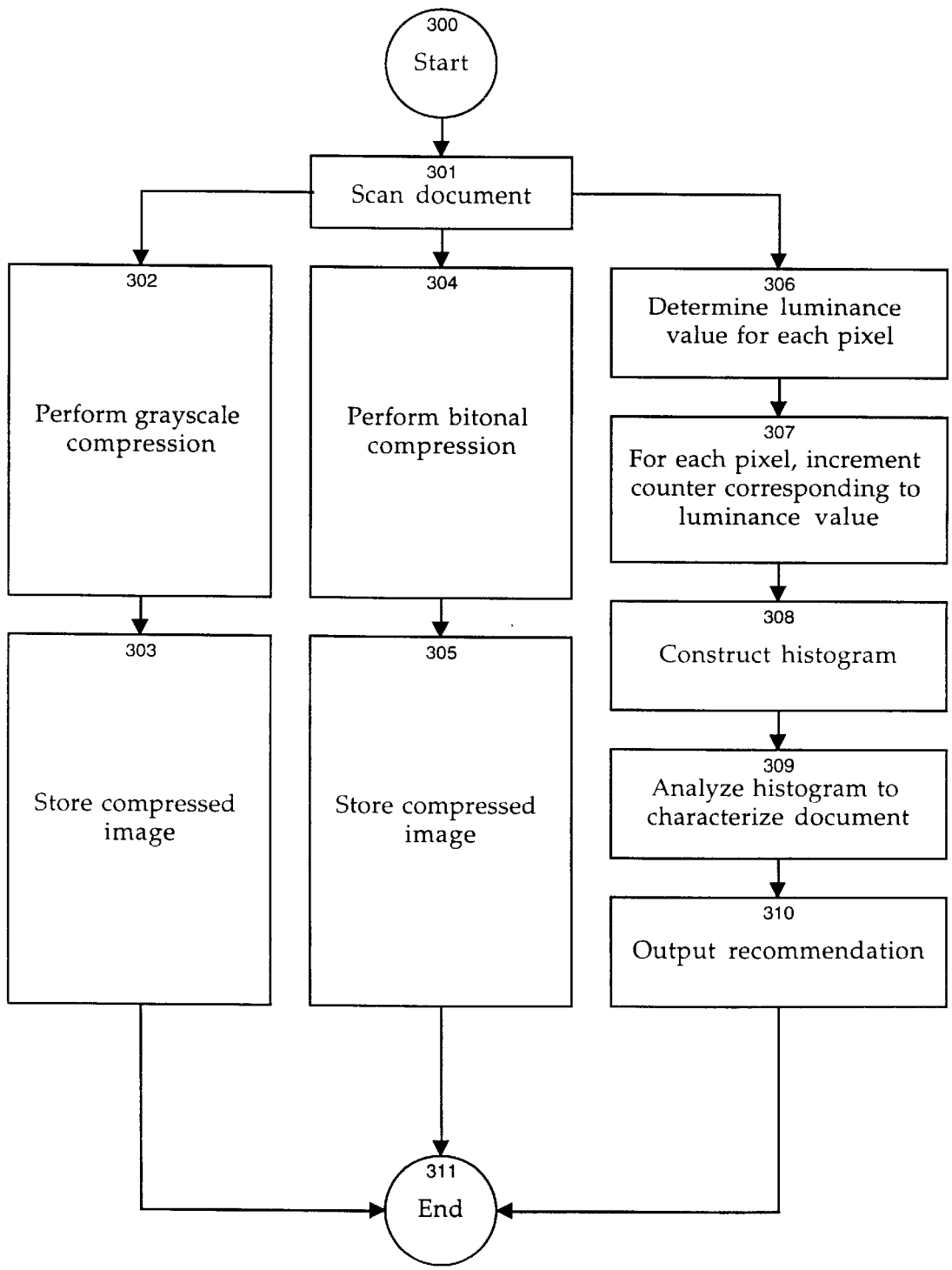
FIG. 3 is a flowchart showing a method of image discrimination according to the present invention.

Referring now to FIG. 3, there is shown a flowchart of an image discrimination method employing histogram analysis. Document 101 is scanned 301 using conventional techniques to create a digitized representation of the source image. System 100 performs 302 grayscale compression, such as JPEG, and stores 303 the compressed image. Concurrently, system 100 performs 304 bitonal compression and stores 305 the compressed image.

Concurrently with 302 to 305, system 100 performs image discrimination as described above in connection with FIG. 2. Image discriminator 107 determines 306 a luminance value for each pixel, increments 307 a counter value corresponding to the luminance value, and constructs 308 a histogram based on the counter values. Image discriminator 107 then analyzes 309 the histogram in order to characterized the document as primarily grayscale or bitonal. Image discriminator outputs 310 a recommendation regarding which stored compressed image should be used.

In one embodiment, the recommendation provided by image discriminator 107 takes the form of a signal which is output to the user. The user can then make the appropriate selection of compressed image based on the output. In another embodiment, the recommendation is used to drive an automated selection apparatus which selects one of the compressed images without user involvement. Finally, an outside application, implemented in hardware or software (not shown) may receive the output signal, along with the various stored compressed images, and perform appropriate selection in a manner that is convenient to the outside application. If appropriate, the outside application may apply optical character recognition (OCR) to the selected compressed representation in order to convert text to ASCII format. Other uses of the output signal may be present in other embodiments.

One embodiment of the present invention provides data selection options to the user, where the user may be an actual human user or an application. The data selection options include:

1) Use recommended selection from image discriminator 107;
2) Override recommendation and specify alternate;
3) Send both images to permanent storage; and
4) Send both images to permanent storage but delete grayscale-compressed image after OCR classification. This may be useful when the system of the present invention is employed in conjunction with an OCR device that uses grayscale data to enhance OCR accuracy. Once the OCR process has been completed, the grayscale image may be deleted.

Each of the above options may include a "thumbnail" or preview image generated as described above in connection with JPEG compression, based on the DC level of the 8×8 blocks used for JPEG compression.

In an alternative embodiment, the above technique is applied to a moving image, and compression techniques may include schemes such as the Motion Picture Experts Group (MPEG) compression for moving images. In addition, image discriminator 107 may operate based on additional characteristics such as the presence or absence of an audio track accompanying the source image.

By applying multiple compression techniques in parallel with each other and with image discrimination, the present invention is able to select among various compression techniques without any loss in throughput. The invention is therefore applicable to scanning systems wherein a one-pass scan of incoming documents is desired, and wherein the image characteristics of such documents are not known in advance.

From the above description, it will be apparent that the invention disclosed herein provides a novel and advantageous system and method of discriminating among image characteristics in order to select among a plurality of compression techniques. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A system for discriminating among image characteristics in order to select among at least two compression techniques, the system comprising:

a first compressor for compressing a source image using a first compression method to obtain a first compressed image;

coupled to the first compressor, a first storage device for storing the first compressed image;

a second compressor for compressing the source image using a second compression method to obtain a second compressed image;

coupled to the second compressor, a second storage device for storing the second compressed image;

an image discriminator for characterizing the source image according to predefined criteria, and to generate and output a recommendation between the first and second compression methods; and coupled to the image discriminator, the first storage device, and the second storage device an input device for accepting a user input signal to select between the first and second compression methods.

2. The system of claim 1, wherein the image discriminator and the first and second compressors operate concurrently on the source image.

3. The system of claim 1, wherein the image discriminator characterizes the source image according to relative quantity of grayscale content.

4. The system of claim 3, wherein:

the first compression method is optimized for grayscale image components; and the second compression method is optimized for bitonal image components.

5. The system of claim 4, wherein the image discriminator characterizes the source image by performing a histogram analysis.

6. The system of claim 4, wherein:

the first compression method is a JPEG compression method; and the second compression method is a bitonal compression method selected from the group consisting of JBIG, G3, and G4 compression methods.

7. The system of claim 1, wherein the image discriminator characterizes the source image according to relative quantity of color content.

8. The system of claim 1, wherein the source image is a moving image, and wherein the image discriminator characterizes the source image according to relative quantity of audio content.

9. The system of claim 1, further comprising a data switch coupled to the image discriminator, the first storage device, and the second storage device, for double-buffered storage of the compressed images and the recommendation.

10. The system of claim 1, wherein the image discriminator:

generates a preview of the image concurrently with operation of the first and second compressors; and stores the generated preview.

11. The system of claim 10, further comprising a preview output device, coupled to the image discriminator, for displaying the generated preview.

12. A method of discriminating among image characteristics in order to select among at least two compression techniques, comprising:

a) compressing a source image using a first compression method to obtain a first compressed image;

b) storing the first compressed image;

c) compressing the source image using a second compression method to obtain a second compressed image;

d) storing the second compressed image;

e) characterizing the source image according to predefined criteria, and generating and outputting a recommendation between the first and second compression methods; and f) accepting a user input to select between the first and second compression methods.

13. The method of claim 12, wherein a), c), and e) are performed concurrently.

14. The method of claim 12, wherein e) comprises characterizing the source image according to relative quantity of grayscale content.

15. The method of claim 14, wherein:

a) comprises compressing the source image using a compression method optimized for grayscale image components; and c) comprises compressing the source image using a compression method optimized for bitonal image components.

16. The method of claim 15, wherein e) comprises characterizing the source image by performing a histogram analysis.

17. The method of claim 15, wherein the source image comprises a plurality of pixels, and wherein e) comprises:

e.1) determining a luminance value for each pixel in the source image;

e.2) for each pixel in the source image, incrementing a counter corresponding to the determined luminance value;

e.3) constructing a histogram from the counters; and e.4) analyzing the constructed histogram to characterize the source image.

18. The method of claim 14, wherein:

a) comprises compressing the source image using a JPEG compression method; and c) comprises compressing the source image using a bitonal compression method selected from the group consisting of JBIG, G3, and G4 compression methods.

19. The method of claim 12, wherein e) comprises characterizing the source image according to relative quantity of color content.

20. The method of claim 12, wherein the source image is a moving image, and wherein e) comprises characterizing the source image according to relative quantity of audio content.

21. The method of claim 12, further comprising:

g) concurrently with a) and c), generating a preview of the image; and h) storing the generated preview.

22. The method of claim 21, further comprising:

i) displaying the generated preview.

23. The method of claim 17, wherein e.4) comprises:

determining a number of pixels in the source image with a mid-level luminance value; and comparing the determined number with a predetermined threshold value.

24. The system of claim 5, wherein the image discriminator:

determines a luminance value for each pixel in the source image;

creates and fills a histogram of the luminance value of each pixel in the source image; and analyzes the histogram of luminance values.

25. The system of claim 24, wherein the image discriminator analyzes the histogram of luminance values by:

determining a number of pixels in the source image with a mid-level luminance value; and comparing the determined number with a predetermined threshold value.

26. The system of claim 1, further comprising:

coupled to at least one of the compressors, a scanner for accepting a document containing the source image.

27. The method of claim 12, further comprising:

prior to compressing the source image, scanning a document to obtain the source image.

* * * * *